United States Patent [19]

Dietrich et al.

[11] Patent Number: 4,830,876
[45] Date of Patent: May 16, 1989

[54] PROCESS FOR PRODUCING CONTACT STRIPS ON SUBSTRATES, ESPECIALLY ON GLAZING

[75] Inventors: Anton Dietrich, Wiesenfelden; Klaus Hartig, Ronneburg; Hans-Christian Schaefer, Langenselbold; Joachim Szczyrbowski, Regensburg, all of Fed. Rep. of Germany

[73] Assignee: Leybold-Heraeus GmbH, Cologne, Fed. Rep. of Germany

[21] Appl. No.: 881,712

[22] Filed: Jul. 3, 1986

[30] Foreign Application Priority Data

Dec. 11, 1985 [DE] Fed. Rep. of Germany ....... 3543694

[51] Int. Cl.⁴ .............................................. B05D 5/12
[52] U.S. Cl. .................................. 427/96; 427/126.2; 427/126.3; 427/269; 427/286; 427/287
[58] Field of Search ............... 427/96, 126.2, 126.3, 427/286, 287, 269; 52/171

[56] References Cited

U.S. PATENT DOCUMENTS

| | | | |
|---|---|---|---|
| 3,623,906 | 11/1971 | Kazuyuki | 427/96 |
| 3,900,634 | 8/1975 | Plumat | 427/96 |
| 4,011,087 | 3/1977 | Short | 427/96 |
| 4,109,044 | 8/1978 | Marriott | 427/96 |
| 4,462,883 | 7/1984 | Hart | 204/192.13 |
| 4,548,691 | 10/1985 | Dietrich | 427/160 |

FOREIGN PATENT DOCUMENTS 917509  12/1972  Canada ................................ 427/96

*Primary Examiner*—Shrive Beck
*Assistant Examiner*—Vi Duong Dang
*Attorney, Agent, or Firm*—Felfe & Lynch

[57] ABSTRACT

Process for the production of contact strips on substrates, especially on plates of mineral glass. These substrates are provided with an electrically conductive surface coating which is coated on the side facing away from the substrate with at least one surface layer of a dielectric material. For the production of the contact strips, a noble metal suspension in a liquid is deposited according to the invention on the surface layer in the pattern of the contact strips. Then the substrate with the pack of layers is exposed to a heat treatment at at least 100° C. until a lowered total resistance occurs through the conductive surface coating between the contact strips.

5 Claims, 2 Drawing Sheets

T = 150 °C
Deckschicht: SnOx

PROCESS FOR PRODUCING CONTACT STRIPS ON SUBSTRATES, ESPECIALLY ON GLAZING

BACKGROUND OF THE INVENTION

1. Field of the Invention

The invention relates to a process for producing contact strips on substrates, especially on plates of mineral glass, which have an electrically conductive surface coating which is covered on the side facing away from the substrate with at least one surface coating of a dielectric material.

2. Discussion of Related Art

The products of such a process often serve, especially when the substrates consist of plates of mineral glass, as the windshields or back windows of motor vehicles. The electrically conductive surface coating, which in this case usually consists of a thin metal coating of high transparency in the visible part of the light spectrum, can be used as a heating resistance for the purpose of melting frost and evaporating moisture due to condensation. It is therefore necessary to provide the resistance coating with appropriate terminal contacts which will assure the most uniform possible distribution of the heat over the entire substrate surface and prevent local overheating in the immediate area of the terminal.

It is additionally desirable, especially in automobile glazing, for the surface coating to reflect the longer-wavelength portion of the sunlight spectrum—the so-called thermal radiation. This thermal radiation is especially undesirable in modern passenger cars with sloping and therefore large-area windshields and back windows, because they can heat the interior of the motor vehicle to intolerable temperatures.

Plates, including those of mineral glass, having such spectral transmission and reflection characteristics, are disclosed in EP-PS No. 35 906, DE-OS No. 33 07 661 and EP-OS No. 104 870. In the known plates, a silver layer having on one or both sides a diffusion barrier composed of a thin metal coating is sandwiched between two oxide layers of which one is a surface layer which protects the metal layers against chemical and/or mechanical attack. While the metal layers, especially the silver layer, have a sufficient electrical conductivity to serve as a heating resistance (at least as long as the plate is not heated to temperatures above 150° C.), the oxide surface layer is a definite insulator which prevents electrical contact with the metal layer or layers underneath it. It is extremely difficult to remove the relatively hard oxide surface coating to a defined thickness for the purpose of providing the metal layer beneath it with contact strips.

Therefore the invention is addressed to the problem of devising a process for the production of contact strips on substrates of the kind described above, which will result in a reliable and stable contact with the electrically conductive surface coating.

The solution of the stated problem is achieved according to the invention in the process outlined above by applying a noble metal suspension in a liquid to the surface coating (of a dielectric material) in the pattern of the contact strips, and exposing the substrate to a heat treatment at least 100° C., until a lowered total resistance occurs through the conductive surface coating between the contact strips.

Noble metal suspensions of this kind are commercially obtainable, for example under the name "Leitsilber 200" of the firm Demetron in Hanau Federal Republic of Germany.

It is known through the book by Dr. A. F. Bogenschuetz, "Oberflaechentechnik und Galvanotechnik in der Elektronik," Eugen G. Leuze Verlag, Saulgau/Wuerttemberg, 1971 edition page 298, to use paste-like suspensions of finely divided silver powder in a lacquer substance in order to make electrical contacts on insulating substances. It is also known through the same literature that the conductivity of such supensions can be substantially improved by thermal aging. Leitsilber (conductive silver) is a silver colloidally dissolved in lacquer, which is applied and dried. An alternative method is to suspend silver powder in a casting resin (Araldit) in order to improve adhesive strength.

Such suspensions are also suitable for the purpose of the present invention. However, when a noble metal suspension of this kind was applied to a set of layers of the kind described above, it was surprisingly found that the noble metal, especially silver, diffuses through the dielectric layer and into the electrically conductive surface coating (of silver for example) on account of the heat treatment, and enters into an intimate bond or interlock with the said layers, which not only assures a stable passage of current, but also an excellent strength of adhesion of the contact strips in question.

SUMMARY OF THE INVENTION

It would appear that the thermally-induced diffusion process of the present invention all the more rapid the higher the temperature is. Experience, however, has shown that at about 100° C. a limit is reached below which this diffusion process consumes an uneconomically long period of time. The diffusion process, however, takes place in an extraordinarily short time when a substrate of mineral glass is used and the heat treatment is performed at the softening temperature of the mineral glass. This softening temperature amounts in the case of a common float glass such as a sodium silicate glass to 640° C.

Heat treatment at such a high temperature offers the additional advantage that the entire glass plate can be plastically deformed after the application of the contact strips in order to bring an automobile window to its final, often severely curved shape. This advantage is not to be underestimated, especially in the production of laminated safety glass. In safety glass of this kind there is a tough elastic interlayer made of a plastic (e.g., polyvinyl butyrate) situated (without air inclusions) between two thin sheets of mineral glass. The two (outer) mineral glass sheets are generally bent together, one on the other, which according to the invention is also possible with the complete set of layers and the contact strips, the set of layers and the contact strips being situated in the space between the two sheets. It is then only necessary—and this step is state of the art—to place the interlayer of the tough elastic plastic between the two mineral glass plates and to bond the plates together in a vacuum by a thermal process. It is apparent that in this case, before this bonding action, the contact strips can also be provided with connecting wires which project outwardly from the plate margins on both sides.

The statement that the heat treatment is performed until a reduced total resistance is achieved in the conductive surface coating between the contact strips is not intended to define a measuring or control process performed in the course of manufacture. The measurement can also be a concluding measurement whereby the parameters (temperature and duration) during the heat treatment are determined empirically. This indicates that the transition resistance between the applied contact strips and the conductive surface coating has become negligibly small and thus a stable and uniform flow of current is assured.

Without such sufficient heat treatment, a very unstable flow of current through the system occurs as well as a manifestly high transition resistance.

In order to permit the best possible diffusion of the noble metal, especially silver, through the dielectric surface coating, an oxide of at least one of the metals of the group, tin, zinc, indium, tantalum, titanium, zirconium, nickel and chrome is used in an especially advantageous manner. These metal oxides permit a sufficient diffusion even when the oxide surface coating has been produced by vapor deposition. If a reactive cathode sputtering process is used as the coating process for applying the oxide surface coating, which is to be preferred for reasons of process control, the group of the oxides or oxide-forming metals can be further substantially expanded because the cathode sputtering process quite obviously results in a layered structure which is better suitable for a process of diffusing the noble metal to make the contact strips. The discovery of this advantage of the cathode sputtering process has been surprising.

The invention also relates to a transparent plate with a substrate having at least one electrically conductive surface coating, which is coated in turn on the side facing away from the substrate with a surface coating of dielectric material. For the solution of the same problem, at least two metallic contact strips are disposed on the surface coating, from which metal atoms diffuse all the way into the electrically conductive surface coating.

Additional advantageous developments of the subject matter of the invention will be found in the other subordinate claims.

The process according to the invention is suitable also and especially for creating contacts on plates such as those manufactured by the method according to the still unpublished DE-OS No. 35 43 178, to which U.S. application Ser. No. 881,704 corresponds.

An embodiment of the process according to the invention will be explained in detail below in conjunction with FIGS. 1 to 4.

DESCRIPTION OF A PREFERRED EMBODIMENT

Figure 1:
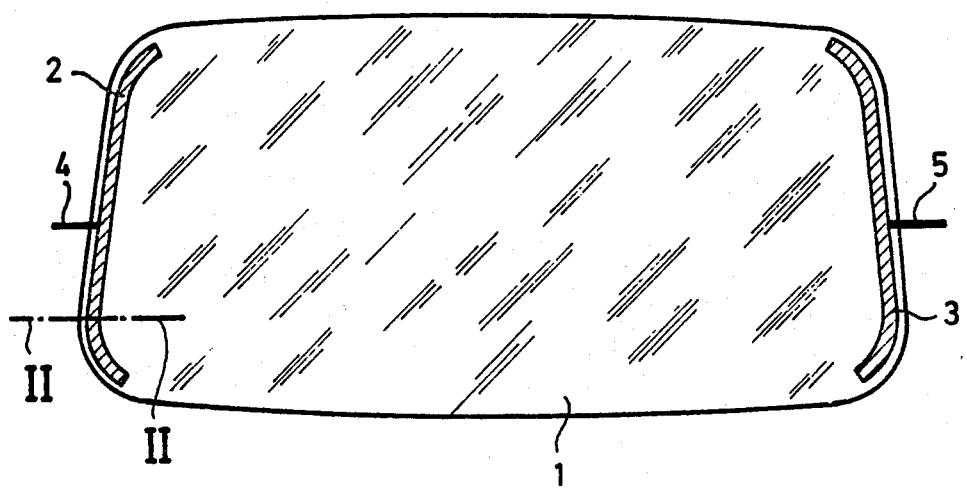
FIG. 1 is a top plan view of a heatable front windshield of a passenger automobile.

In FIG. 1 there is represented a sheet 1 of a mineral glass of the kind typically used in automobile windshields and rear windows. In the marginal area of the two short sides there are disposed two contact strips 2 and 3 which have been made by the process according to the invention and are bonded to lead wires 4 and 5. The arrangement of the contact strips 2 and 3 makes it possible for the heating current to flow uniformly through the area between them.

The arrangement need not be as represented in FIG. 1. Other geometrical configurations of the contact strips are possible, and it is necessary only to assure that the entire heating power is distributed in an approximately uniform manner over the entire surface between the contact strips.

Figure 2:
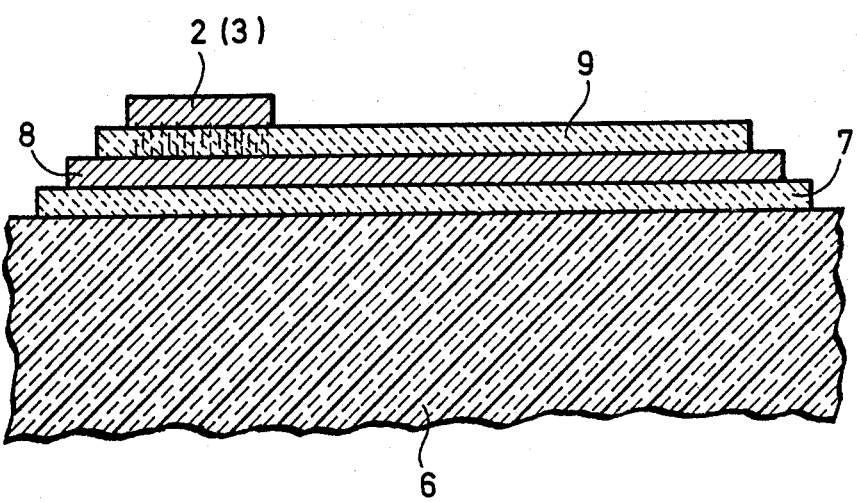
FIG. 2 is a cross section through the subject of FIG. 1, taken along line II—II.

In FIG. 2 is shown a substrate 6 which is the supporting element of the entire sheet. The substrate 6 first supports a layer 7 which consists of a dielectric oxide, tin oxide in the present case. On this primary coating is an electrcally conductive second layer 8 which can be composed of a plurality of metallic coatings, but this is not especially indicated in the drawing, for the sake of simplicity. In the present case the second layer 8 consists of a total of three layers, namely a central silver layer which is embedded between two layers of slight thickness of nickel. Layer 8 is electrically conductive, and the conductivity is enhanced by a heat treatment. This is a surface coating which covers substantially the entire surface of the substrate 6.

On the electrically conductive layer 8 there is again a third layer, namely a surface layer 9 which serves as protection against mechanical and chemical attack. The surface layer 9, like layer 7, consists of tin oxide with a thickness of about 30 nm. A brushable or spreadable noble metal suspension in a solvent and binding agent ("Leitsilber 200") has been applied to this surface coating. After drying and after the heat treatment, this noble-metal suspension has formed the contact strip 2 (see also FIG. 1).

By virtue of the heat treatment, the metal of contact strip 2 has penetrated atomically by diffusion into the electrically conductive surface coating 8, which is indicated by the hatched area between the contact strip 2 and the surface coating 8. By this diffusion process, the original dielectric or oxide has been doped with the noble metal of the suspension—silver in the present case—so that a current can flow between the electrically conductive surface coating 8 and the contact strip 2 (and similarly, of course, the contact strip 3). The contact strips in turn can be connected to the terminal wires 4 and 5, by a soldering process, for example.

Figure 3:
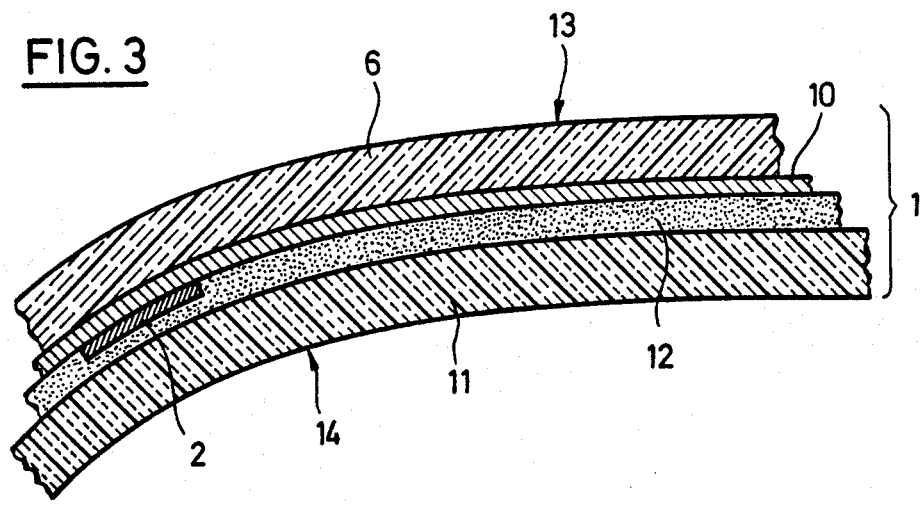
FIG. 3 is a section through a laminated safety glass.

FIG. 3 shows a laminated safety glass which has been produced by bending an arrangement according to FIG. 2. For this purpose the substrate 6 has been bent together with its pack of layers 10, which here represents the layers 7, 8 and 9 of FIG. 2, and with the contact strips 2 and 3 of which only contact strip 2 is shown here. The bending process has been formed together with an additional, uncoated sheet 11, so that the contacting surfaces of substrate 6 and sheet 11 have virtually identical geometrical shapes. The layer pack 10 and the contact strips 2 and 3 can in this case be disregarded, since in comparison with the thickness of substrate 6 and sheet 11 they are negligibly thin. Between the substrate 6 with its layer pack 10 and the contact strips 2 and 3, on the one hand, and the sheet 11 on the other, there is placed a film 12 of a tough elastic plastic (polyvinylbutyrate). With reference to the vehicle interior, the free surface 13 of the substrate 6 is the exterior or weather side, while the free surface 14 of the sheet 11 faces the vehicle interior. As a result, the layer pack 10 is situated on the inner side of the outer sheet or substrate 6.

EXAMPLES

EXAMPLE 1

Figure 4:
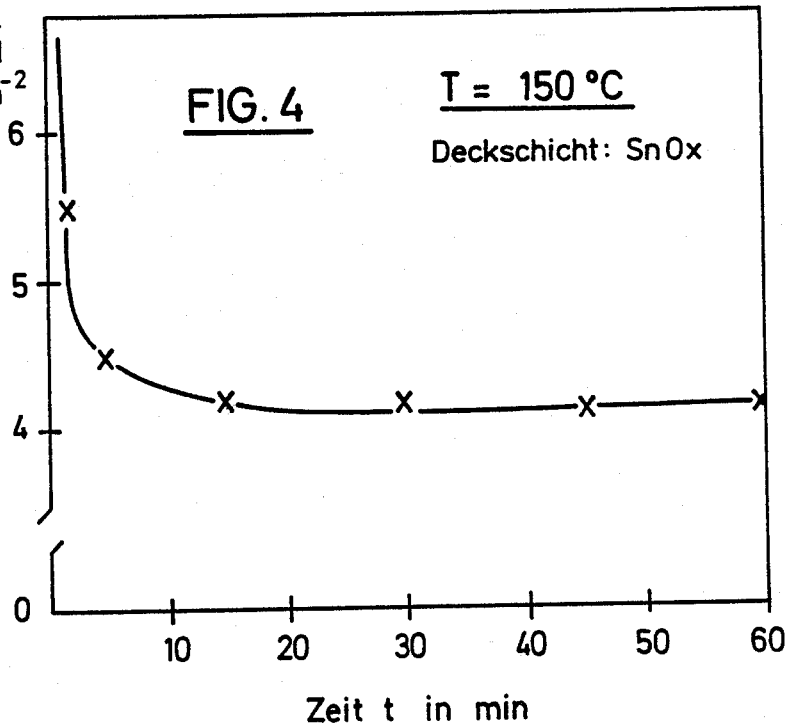
FIG. 4 is a diagram showing a curve representing the change in time of the total resistance from one contact strip through the dielectric, the conductive surface coating, and the other dielectric coating to the other contact strip, due to increased doping of the dielectric by the noble metal from the suspension.

A substrate 6 according to FIG. 2 was coated, after layers 7, 8 and 9 had been applied, by means of magnetron cathodes in a Model A 1100 Z3H/4 cathode sputtering apparatus made by Leybold-Heraeus GmbH, and then provided with two contact strips 2 and 3 by applying a conductive paste of the "Leitsilber 200" type through a stencil (i.e., via a screenprinting proess) in the surface pattern shown in FIG. 1. Then the entire system of substrate 6, layers 7, 8 and 9, and the conductive strips 2 and 3 were heated in air in the horizontal state to a uniform temperature of 150° C. and kept at this temperature for a period of 60 minutes. During this period the total resistance between the contact strips 2 and 3 was measured. After about 2 minutes a marked decrease of the total resistance between the contact strips 2 and 3 occurred, the decrease coming to a standstill after 20 minutes. The change in resistance versus time is represented in FIG. 4. The high resistance values (under 4 minutes) include the high transition resistances between the contact strips (2, 3) and the conductive surface coating (8), and the horizontal portion of the curve represents the resistance of the surface coating (8) which no longer changes to any great degree.

EXAMPLE 2

The example in accordance with FIG. 1 was repeated, except that the substrate 6 with the layers 7, 8 and 9 and with the contact strips 2 and 3 was heated uniformly in air to a temperature of 640° C. and bent (i.e., plastically deformed) at the same temperature. The reduction of the total resistance between the contact strips 2 and 3 occurred even before the end temperature of 640° C. was reached, so that it was concluded that the diffusion process had already reached all the way to the electrically conductive layer 8.

The graphic representation applies, of course, only to a specific system of layers and a specific treatment temperature, but it is similar or analogous for other systems of layers and temperatures.

We claim:

1. Process for producing a contact strip on a dielectric layer of a transparent substrate, which substrate has an electrically conductive surface coating on a side of said dielectric layer facing away from said contact strip, comprising applying to said dielectric layer of said coated substrate a liquid suspension of a noble metal in a pattern of said contact strip, and subjecting said substrate to heat treatment at least 100° C. so as to effect diffusion of said noble metal into said dielectric layer, thereby providing lowered resistance between said contact strip and said conductive surface coating.

2. Process of claim 1, wherein said noble metal suspension comprises silver in a liquid which contains a binding agent.

3. Process of claim claim 1, wherein said suspension is applied via a screen printing process.

4. Process of claim 1, wherein said electrically conductive surface coating comprises at least one oxide of tin, zinc, indium, titanium, tantalum, zirconium, nickel and chrome.

5. Process of claim 3, wherein said substsrate is mineral glass, said heat treatment taking place at the softening temperature thereof.

* * * * *